(12) United States Patent
Takasu

(10) Patent No.: US 7,584,831 B2
(45) Date of Patent: Sep. 8, 2009

(54) ONE-WAY CLUTCH

(75) Inventor: Yasuhide Takasu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 300 days.

(21) Appl. No.: 11/452,255

(22) Filed: Jun. 14, 2006

(65) Prior Publication Data

US 2006/0289262 A1 Dec. 28, 2006

(30) Foreign Application Priority Data

Jun. 22, 2005 (JP) ............................. 2005-181705

(51) Int. Cl.
  *F16D 41/07* (2006.01)
  *F16D 13/74* (2006.01)
(52) U.S. Cl. ............... 192/45.1; 192/41 R; 192/107 M; 192/113.32
(58) Field of Classification Search ............. 192/113.32
  See application file for complete search history.

(56) References Cited

U.S. PATENT DOCUMENTS

| | | | | | |
|---|---|---|---|---|---|
| 3,730,316 | A | * | 5/1973 | Zimmer | 192/41 A |
| 4,878,570 | A | * | 11/1989 | Zlotek | 192/45 |
| 4,895,234 | A | * | 1/1990 | Fujino | 192/42 |
| 5,320,204 | A | * | 6/1994 | Riggle et al. | 192/45.1 |
| 2003/0085092 | A1 | * | 5/2003 | Fukui et al. | 192/45 |
| 2005/0082139 | A1 | * | 4/2005 | Ishikawa et al. | 192/107 M |
| 2005/0119136 | A1 | * | 6/2005 | Castle | 508/363 |

FOREIGN PATENT DOCUMENTS

JP 2006-170372 A * 6/2006

* cited by examiner

*Primary Examiner*—Richard M. Lorence
(74) *Attorney, Agent, or Firm*—Miles & Stockbridge P.C.

(57) ABSTRACT

According to the present invention, in a one-way clutch used under an environment where lubricating oil including organic molybdenum exists, at least a part of at least one of a plurality of engaging members constituting the one-way clutch is subjected to surface treatment mainly including an element having no affinity with respect to a molybdenum element.

22 Claims, 2 Drawing Sheets

ONE-WAY CLUTCH

BACKGROUND OF THE INVENTION

1. Field of the Invention

The present invention relates to a one-way clutch used in lubricating oil to which organic molybdenum is added.

2. Related Background Art

A one-way clutch includes outer and inner races which are rotated relative to each other and is constructed so that rotational torque is transmitted in only one direction by engaging sprags or rollers for transmitting the torque between the outer and inner races with a cam face provided on a track surface of the outer or inner race and that the clutch is idly rotated in an opposite direction.

In general, a clutch is used as a torque converter or a transmitting mechanism of an automatic transmission of a vehicle and as a starter of a motor bicycle. Among one-way clutches used as the starter, as a lubricating condition, there are one-way clutches in which the one-way clutch is lubricated in common with the lubricating of the engine. In this case, the engine oil is used to lubricate the one-way clutch.

By the way, in recent years, in order to reduce friction for the purpose of achieving low fuel consumption, engine oil to which organic molybdenum is added has been used. The reason is that the organic molybdenum represented by molybdenum diocarbide (MODTC) has the effect for considerably reducing friction between metal parts.

However, if the engine oil to which the organic molybdenum is added is used as the lubricating oil for the one-way clutch as well as the engine, there arises a problem that an engaging service life of the one-way clutch is reduced, with the result that the clutch cannot maintain engagement, thereby making it impossible to transmit the torque.

Regarding the sprag which is one of constructional members of the one-way clutch, since the sprag as a torque transmitting member is subjected to great face pressure during the transmission of the torque, the sprag is formed from bearing steel such as SUJ2 material, or is formed from heat-resistive bearing steel such as M50 material if the sprag is used under a high temperature environment. If such a one-way clutch of sprag type is used with the lubricating oil same as the engine oil, since the sprag is subjected to the engagement and the idle rotation repeatedly during use, the engaging surfaces of the one-way clutch are engaged with high face pressure repeatedly under a high temperature lubricating condition.

In this case, if the organic molybdenum is added to the engine oil, since heavy metal such as Cr included in the SUJ2 material and the M50 material constituting the sprag and molybdenum (Mo) greatly included in the M50 material belong to 6A group transition metal same as molybdenum of the organic molybdenum added to the lubricating oil, affinity becomes strong. In particular, it is considered that, as is often the case with the sprag, if the same cam face area is exposed to the high face pressure, the adhesion of the organic molybdenum onto the cam face of the sprag is promoted, with the result that the organic molybdenum adhered to the cam face of the sprag is decomposed to form a surface coating or film mainly including molybdenum disulfide ($MOS_2$) on the friction surface, thereby reducing the coefficient of friction to generate slip.

In the engine oil to which the organic molybdenum is added, it was ascertained that, when a stroking endurance tests with repeated load were performed at a temperature of 130° C., the sprags of the one-way clutch cannot engage with the outer or inner race at certain cycles or more.

SUMMARY OF THE INVENTION

Thus, an object of the present invention is to provide a one-way clutch in which, even if it is used under an environment where lubricating oil including organic molybdenum additive exists, an adequate engaging ability is ensured and an engaging service life is enhanced, by preventing the reduction of coefficient of friction.

To achieve the above object, the present invention provides a one-way clutch used under an environment where lubricating oil including organic molybdenum additive exists, wherein at least one of a plurality of engaging members constituting the one-way clutch is subjected to surface treatment including elements having no affinity with respect to molybdenum elements as main components.

According to the present invention, the following advantages can be obtained.

Since the surface treatment mainly including the elements having no affinity with respect to the molybdenum element is applied to at least one of the plural engaging members constituting the one-way clutch, even when the one-way clutch is used under the environment where the lubricating oil including the organic molybdenum exists, reduction of the coefficient of friction can be prevented, with the result that the adequate engaging ability of the sprags can be ensured and a service life of the one-way clutch can be enhanced.

That is to say, in the conventional techniques, if the one-way clutch, as well as the engine, was lubricated by the engine oil to which the organic molybdenum is added, premature slip was generated in the one-way clutch. However, according to the present invention, the one-way clutch and the engine can be lubricated by the same oil in common, and the one-way clutch can be used within the engine room.

In the present invention, under the lubricating condition in which the oil to which the organic molybdenum is added is used, the surface treatment mainly including the elements having no affinity with respect to the molybdenum element is applied to the surfaces of the sprags. As a result, the engaging service life is greatly enhanced.

Diamond-like carbon (DLC) or carbonized tungsten/carbon (WC/C), as the element having no affinity, is coated on the surfaces of the sprags. As a result, due to inherent properties of such elements, for example, capable of obtaining a high friction-resistive smooth surface, the engaging ability can be enhanced greatly.

Further, in another method, by using a carbon coating produced in sprag heat treatment processing (from heating to cooling by means of quenching oil), the engaging service life of the sprag is greatly enhanced, in comparison with conventional sprags used in conventional automatic transmissions and starters, in which the carbon coating was removed by barrel working after the quenching.

Further, also when electroless nickel (as element having no affinity) plating is applied to the sprags, the engaging service life can be enhanced similarly.

The present invention can be applied to a plurality of members constituting the one-way clutch, in particular, each of the engaging members. In the one-way clutch of sprag type, the present invention can be applied only to the sprags, outer race or inner race which constitute the engaging members or can be applied to any combination of the engaging members. In a one-way clutch of roller clutch type, engaging members include rollers, an outer race and an inner race. In a one-way clutch of outer race cam clutch type, an outer race is provided with a cam face, and, in a one-way clutch of inner race cam clutch type, an inner race is provided with a cam face. The one-way clutch of roller clutch type can similarly be considered.

A term "surface treatment" used in this specification also includes a treatment for forming a coating or film onto a surface partially or completely, such as coating (film forming), plating and aggregating and a treatment for reforming a surface.

DESCRIPTION OF THE PREFERRED EMBODIMENTS

Figure 1:
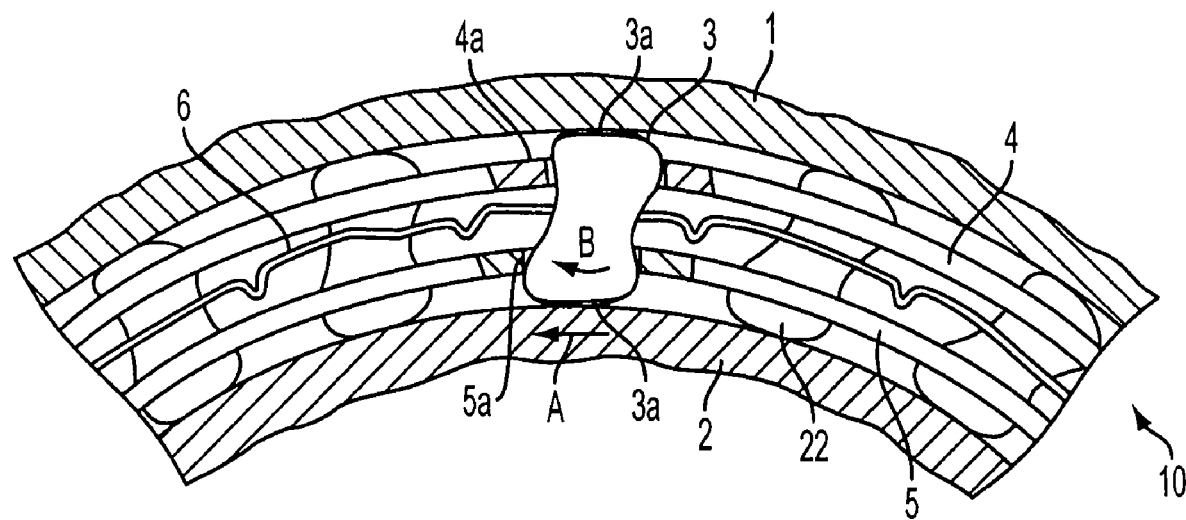
FIG. 1 is a partial sectional view of a one-way clutch of sprag type to which the present invention is applicable.

Now, the present invention will be fully described with reference to the accompanying drawings. FIG. 1 is a partial sectional view of a one-way clutch of sprag type to which the present invention is applicable. The one-way clutch 10 of sprag type comprises an outer race 1, an inner race 2 disposed coaxially with the outer race 1 and rotatable relative to the outer race, and an outer holder 4 and an inner holder 5 which are disposed between the outer race 1 and the inner race 2.

Substantially annular outer holder 4 and inner holder 5 are provided with a plurality of windows 4a and 5a passing radially through the holders, respectively, and sprags 3 are pivotally held within the windows 4a and 5a. A substantially annular ribbon spring 6 is disposed between the outer holder 4 and the inner holder 5 so that the ribbon spring affords raising or cocking moment to the sprags 3 to contact the sprags 3 with the outer race 1 and the inner race 2.

In FIG. 1, when the inner race 2 is rotated idly in a direction shown by the arrow A, since the sprags 3 are pivoted (rotated) in a direction shown by the arrow B to incline the sprags 3 toward an idle rotation side, contact face pressure between the sprags 3 and the inner race 2 is decreased to reduce the friction, with the result that the one-way clutch can be rotated idly. On the other hand, when the inner race 2 is rotated idly in a direction opposite to the direction A, the sprags 3 are cocked by a biasing force of the ribbon spring 6, so that the sprags are positively engaged with track surfaces of the outer and inner races 1 and 2, respectively. Consequently, the outer race 1 and the inner races 2 of the one-way clutch 10 cannot be rotated relative to each other, with the result that the torque can be transmitted and, at the same time, the one-way clutch performs a function as a back stopper.

Next, surface treatment of the present invention will be explained. Here, an example in which the surface treatment is applied to engaging surfaces 3a of the sprag 3 as the torque transmitting member among various engaging members constituting the one-way clutch 10 will be described. Although the surface treatment can be applied to the whole surface of the sprag 3, the surface treatment may be applied to at least a part of the surface of the sprag. Further, even when the surface treatment is applied to the engaging surfaces 3a, the surface treatment may be applied to at least a part of the engaging surfaces 3a, rather than the whole engaging surfaces 3a.

Figure 1A:
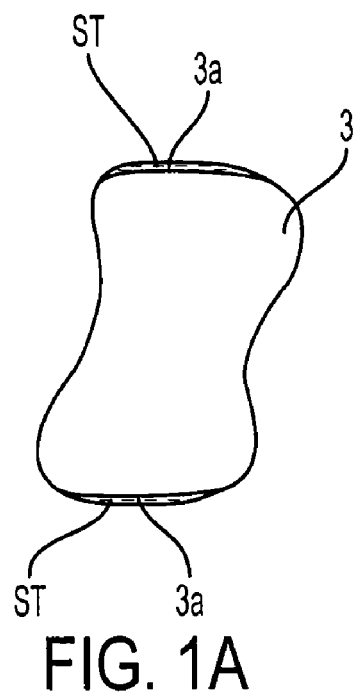
FIG. 1A is a view showing a portion of FIG. 1 enlarged.

In each of the embodiments described hereinafter, a surface treatment ST applied to engaging surfaces 3a is indicated in FIG. 1A.

As a metal material forming the sprag 3, bearing steel such as SUJ2 material or heat-resistive bearing steel such as M50 material suitable to be used under a higher temperature environment is used. The following Table 1 shows chemical components and metal contents of the material used.

TABLE 1

|  | C | Si | Mn | Cr | Mo | V |
|---|---|---|---|---|---|---|
| SUJ2 | 1.00 | 0.25 | <0.5 | 1.45 | — | — |
| M50 | 0.80 | 0.30 | 0.30 | 4.00 | 4.25 | 1.00 |

(%)

A carbon element was used as an element having no affinity with respect to a molybdenum element, and various surface treatments were applied to the engaging surface of the sprag 3. In embodiments, although the SUJ2 material was used as the metal material, it should be noted that the M50 material can be used.

Figure 2:
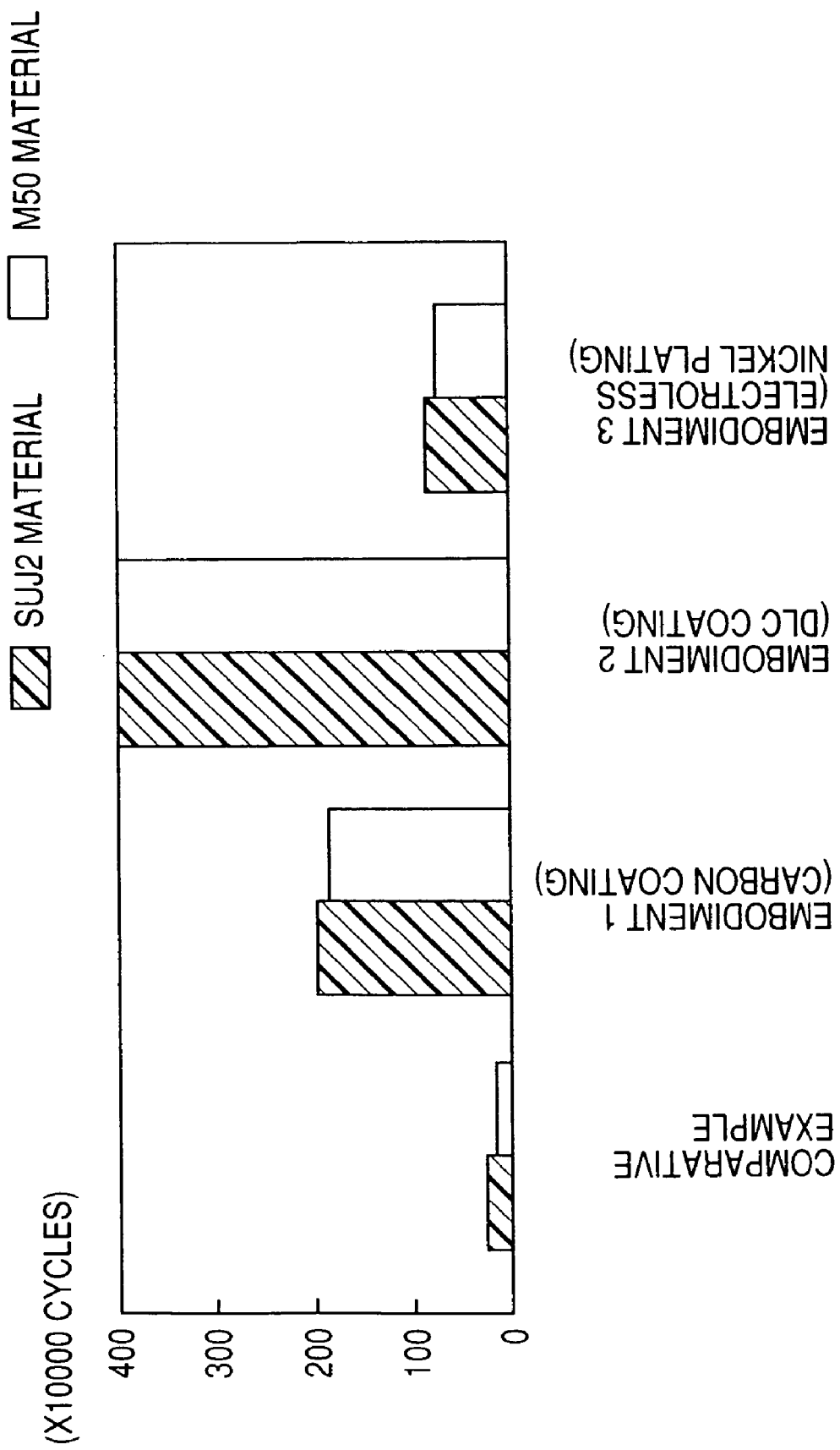
FIG. 2 is a graph showing the result of stroking tests.

FIG. 2 is a graph showing the results of stroking tests. The stroking tests were performed using the SUJ2 material and the M50 material as the sprag material, as a comparative example and embodiments 1 to 3. Now, the various embodiments will be explained. First of all, in an embodiment 1, a carbon coating produced in the heat treatment processing of the sprag 3 was formed on the surface of the sprag 3 in order to aggregate carbon elements on the surface of the sprag 3.

Next, in an embodiment 2, the surface of the sprag 3 was coated by diamond-like carbon (DLC) in order to aggregate carbon elements on the surface of the sprag 3. Further, in an embodiment 3, electroless nickel plating was applied to the surface of the sprag 3, rather than the carbon coating.

Further, as an embodiment 4, similar to the embodiment 2, in order to aggregate carbon elements on the surface of the sprag 3, the surface of the sprag 3 was coated by carbonized tungsten/carbon (WC/C). It was found that the result of the stroking test for the embodiment 4 was substantially the same as the result in the embodiment 2 shown in FIG. 2.

In a comparative example, the SUJ2 material and the M50 material were used and no coating was applied to the surface of the sprag 3.

Here, with reference to FIG. 2, the results of the stroking tests performed under the following conditions in the comparative example and the various embodiments of the present invention will be explained. Incidentally, a bar graph represents the number of cycles on the limit at which the engaging ability is considerably reduced.

Stroking test: load torque 220 N-m
Lubricating condition: molybdenum diocarbon (MoDTC) added; engine oil 130° C.

In the comparative example wherein the sprag which was not subjected to the surface treatment, regarding both the SUJ2 material and the M50 material, the engaging ability was considerably reduced at the number of cycles smaller than about 300000. To the contrary, in the embodiment 1, the engaging ability was maintained till about 2000000 cycles. Further, in the embodiment 2, the engaging ability was maintained till more than about 4000000 cycles. In the embodiment 3, the engaging ability was maintained till around about 1000000 cycles. In addition, in these embodiments, even when either the SUJ2 material or the M50 material was used as the material of the sprag 3, it was found that the limit engaging abilities were substantially identical.

It can be seen that the embodiments 1 to 3 provide the excellent effect for maintaining the engaging ability, in comparison with the comparative example. Accordingly, the one-way clutch can be used around the engine, which was difficult in the conventional techniques.

In the above embodiments, while an example that the surface treatment is applied to the engaging surfaces 3a of the sprag 3 was explained, the present invention may be applied to a plurality of engaging members constituting the one-way clutch, particularly to each of the engaging members. For example, the surface treatment may be applied to the inner peripheral track surface of the outer race 1 and the outer peripheral track surface of the inner race 2 and the surface treatment may not be applied to the sprag 3.

That is to say, the surface treatment of the present invention may be applied to at least one of members engaged with each other. Further, regarding the kinds of the surface treatments, any combination of the surface treatment methods used in the embodiments 1 to 3 can freely be used. For example, DLC coating may be applied to the sprag 3 and carbon coating may be applied to the track surface(s) of the outer race 1 and/or the inner race 2.

Further, is should be noted that the surface treatment of the present invention can be applied to not only a so-called one-way clutch of double-holder type having the outer and inner holders shown in FIG. 1 but also a one-way clutch having a single holder. Further, the present invention can be applied to one-way clutches of roller clutch type, one-way clutches of outer race cam clutch type, and one-way clutches of inner race cam clutch type, rather than the one-way clutches of sprag type.

This application claims priority from Japanese Patent Application No. 2005-181705 filed Jun. 22, 2005 which is hereby incorporated by reference herein.

What is claimed is:

1. A one-way clutch constructed to operate in an environment where lubricating oil including organic molybdenum exists, wherein:
   at least a part of at least one of a plurality of engaging members constituting said one-way clutch has a surface mainly including an element having no affinity with respect to the organic molybdenum and that prevents reduction of a coefficient of friction at the surface, and
   wherein the element having no affinity with respect to the organic molybdenum is a carbon containing element.

2. A one-way clutch according to claim 1, wherein the carbon containing element is an aggregation on said surface.

3. A one-way clutch according to claim 1, wherein the carbon containing element is a coating of diamond-like carbon.

4. A one-way clutch according to claim 1, wherein the carbon containing element is a coating of carbonized tungsten/carbon.

5. A one-way clutch according to claim 1, wherein the carbon containing element is a coating of carbon produced in a heat treatment.

6. A one-way clutch according to claim 1, wherein the engaging members of said one-way clutch comprise an outer race, an inner race disposed coaxially with said outer race and rotatable relative to said outer race, and a torque transmitting member disposed between said outer race and said inner race and adapted to transmit torque.

7. A one-way clutch according to claim 6, wherein the surface is at least a part of said torque transmitting member.

8. A one-way clutch constructed to operate in an environment where lubricating oil including organic molybdenum exists,
   wherein at least a part of at least one of a plurality of engaging members constituting said one-way clutch has a surface mainly including an element having no affinity with respect to the organic molybdenum and that prevents reduction of a coefficient of friction at the surface, and
   wherein the element having no affinity with respect to the organic molybdenum is a nickel plating.

9. A one-way clutch according to 8, wherein the engaging members of said one-way clutch comprise an outer race, an inner race disposed coaxially with said outer race and rotatable relative to said outer race, and a torque transmitting member disposed between said outer race and said inner race and adapted to transmit torque.

10. A one-way clutch according to claim 9, wherein the surface is at least a part of said torque transmitting member.

11. A one-way clutch constructed to operate in an environment where lubricating oil including organic molybdenum exists, said clutch having a plurality of engaging members that transmit torque by virtue of frictional contact between engaging members, at least a part of at least one of the plurality of engaging members having a frictional contact surface with means, mainly including an element having no affinity with respect to the organic molybdenum, for preventing reduction of a coefficient of friction at the frictional contact surface,
   wherein the element having no affinity with respect to the organic molybdenum is a carbon containing element.

12. A one-way clutch according to claim 11, wherein the carbon containing element is an aggregation on said surface.

13. A one-way clutch according to claim 11, wherein the carbon containing element is a coating of diamond-like carbon.

14. A one-way clutch according to claim 11, wherein the carbon containing element is a coating of carbonized tungsten/carbon.

15. A one-way clutch according to claim 11, wherein the carbon containing element is a coating of carbon produced in a heat treatment.

16. A one-way clutch according to claim 11, wherein said engaging members include an outer race, an inner race disposed coaxially with said outer race and rotatable relative to said outer race, and a torque transmitting member disposed between said outer race and said inner race and adapted to transmit torque.

17. A one-way clutch according to claim 16, wherein the surface is at least a part of said torque transmitting member.

18. A one-way clutch according to claim 11, wherein the clutch is disposed in said environment.

19. A one-way clutch constructed to operate in an environment where lubricating oil including organic molybdenum exists, said clutch having a plurality of engaging members that transmit torque by virtue of frictional contact between engaging members, at least a part of at least one of the plurality of engaging members having a frictional contact surface with means, mainly including an element having no affinity with respect to the organic molybdenum, for preventing reduction of a coefficient of friction at the frictional contact surface,
   wherein the element having no affinity with respect to the organic molybdenum is a nickel plating.

20. A one-way clutch according to claim 19, wherein said engaging members include an outer race, an inner race disposed coaxially with said outer race and rotatable relative to said outer race, and a torque transmitting member disposed between said outer race and said inner race and adapted to transmit torque.

21. A one-way clutch according to claim 20, wherein the surface is at least a part of said torque transmitting member.

22. A one-way clutch according to claim 19, wherein the clutch is disposed in said environment.

* * * * *